US008825724B2

(12) United States Patent
Mitra et al.

(10) Patent No.: US 8,825,724 B2
(45) Date of Patent: Sep. 2, 2014

(54) FILE SYSTEM HINTING

(75) Inventors: Rebanta Mitra, Milpitas, CA (US);
Mahesh Shivanagouda Hiregoudar,
Bengaluru (IN); **Anantha Keerthi
Banavara Ramaswamy**, Bengaluru (IN)

(73) Assignee: LSI Corporation, San Jose, CA (US)

( * ) Notice: Subject to any disclaimer, the term of this patent is extended or adjusted under 35 U.S.C. 154(b) by 166 days.

(21) Appl. No.: 13/433,851

(22) Filed: Mar. 29, 2012

(65) Prior Publication Data

US 2013/0262533 A1  Oct. 3, 2013

(51) Int. Cl.
*G06F 17/30* (2006.01)

(52) U.S. Cl.
USPC ............ 707/822; 707/607; 711/165; 711/114

(58) Field of Classification Search
USPC ................ 707/755, 783, 797, 822, 607, 770;
711/112, 114, 165, 154, 100; 710/33,
710/36; 718/100, 102, 104, 781
See application file for complete search history.

(56) References Cited

U.S. PATENT DOCUMENTS

| | | | |
|---|---|---|---|
| 6,219,693 B1 * | 4/2001 | Napolitano et al. .......... 709/203 |
| 6,301,605 B1 * | 10/2001 | Napolitano et al. .......... 709/201 |
| 6,381,674 B2 | 4/2002 | DeKoning et al. |
| 6,728,840 B1 | 4/2004 | Shatil et al. |
| 6,993,520 B2 * | 1/2006 | Doyle et al. ........................... 1/1 |
| 7,676,630 B2 | 3/2010 | Qiao |
| 7,853,759 B2 * | 12/2010 | Sadovsky et al. ............. 711/154 |
| 8,381,213 B1 * | 2/2013 | Naamad et al. ............... 718/100 |
| 2005/0132212 A1 | 6/2005 | Haswell |
| 2005/0154825 A1 * | 7/2005 | Fair ............................... 711/113 |
| 2008/0263259 A1 * | 10/2008 | Sadovsky et al. ............. 711/100 |
| 2009/0070300 A1 * | 3/2009 | Bartels et al. ...................... 707/3 |
| 2009/0287750 A1 | 11/2009 | Banavar et al. |
| 2009/0319724 A1 | 12/2009 | Oe et al. |
| 2010/0199036 A1 * | 8/2010 | Siewert et al. ................ 711/112 |
| 2011/0276578 A1 * | 11/2011 | Allalouf et al. ............... 707/755 |
| 2012/0017020 A1 | 1/2012 | Pruthi et al. |
| 2012/0317337 A1 * | 12/2012 | Johar et al. .................... 711/103 |

FOREIGN PATENT DOCUMENTS

| | | |
|---|---|---|
| EP | 1582986 | 10/2005 |
| WO | 2006082592 | 8/2006 |

OTHER PUBLICATIONS

Technical specification for a protected non-volatile RAM filesystem, 2007.*

* cited by examiner

*Primary Examiner* — Jean M Corrielus
(74) *Attorney, Agent, or Firm* — Suiter Swantz pc llo (57) ABSTRACT

A method for generating and communicating file system hints. The method may include receiving an I/O request from a file system layer and checking the I/O request for file system contextual information. The method may also include accessing the file system layer to determine attributes of the file system contextual information and receiving the attributes of the file system contextual information from the file system layer. The method may further include analyzing attributes of the file system contextual information and generating a hint based upon analyzing the attributes of the file system contextual information. The method may include a mechanism to provide weight-age of data passed from the application. The hint may be associated with the I/O request, and the hint may comprise hotness information to increase efficiency of data accessibility at a lower level storage tier. The method may include sending the hint to the lower level storage tier.

20 Claims, 9 Drawing Sheets

FILE SYSTEM HINTING

FIELD OF THE INVENTION

The present invention is directed generally toward a method and apparatus for deriving, generating, and communicating file system hints and/or application driven hints. The file system hints may be generated and communicated to a lower level storage tier based upon file system contextual information intercepted from an I/O request issued by a file system layer.

BACKGROUND OF THE INVENTION

Current cache-based storage systems are unable to effectively determine or derive file system aware contextual information. Current cache-based storage systems, such as cache-based storage systems operating at very low levels as a tier-2 cache, lack a context of and proximity to file system I/Os. Because of the lack of context and lack of proximity, current cache-based storage systems lack an ability to improve data accessibility based upon the importance of the data being received. Additionally, because current cache-based storage systems lack a context of and proximity to file system I/Os, current cache-based storage systems necessarily lack the ability to obtain information about data access patterns of applications.

Being at a very low level, a tiered storage system or a storage controller of a lower level storage system or device is not aware of a data access pattern of an application or a file system. Lower levels (such as those housing a lower level storage system (e.g., a lower level RAID storage system)) do not have a means to directly obtain information about the type of data being accessed from the file system or from an application. The lower level storage system may be working as a tier-2 caching tiered storage system; however, host-side caching information is not passed to the cache of the lower level storage system.

Currently, there is no mechanism for application specific information to be sent down or passed down to a lower level storage system.

Therefore, it may be desirable to provide a method and apparatus which address the above-referenced problems.

SUMMARY OF THE INVENTION

Accordingly, a method is included for generating and communicating file system hints. The method may include receiving an I/O request from a file system layer and checking the I/O request for file system contextual information. The method may also include accessing the file system layer to determine attributes of the file system contextual information and receiving the attributes of the file system contextual information from the file system layer. The method may further include analyzing attributes of the file system contextual information and generating at least one hint based upon analyzing the attributes of the file system contextual information. The hint may indicate the importance of the data as determined by the attributes of the file system contextual information, and the relative importance of the data associated with the hint determines whether the data is to reside in a relatively faster storage medium or a relatively slower storage medium. Additionally, the method may include sending the at least one hint to a lower level storage tier.

Additionally, a device is included. The device may be configured to attach to a system topology for generating and communicating file system hints. The device may comprise at least a filter driver configured to communicate with a file system layer, a block layer, and lower level storage tier of the system topology. The filter driver may comprise at least a hint engine and a communication component. Additionally, the filter driver may further be configured at least to: receive an I/O request from the file system layer; check the I/O request for file system contextual information; access the file system layer to determine attributes of the file system contextual information; receive the attributes of the file system contextual information from the file system layer; analyze attributes of the file system contextual information; generate at least one hint based upon analyzing the attributes of the file system contextual information, said at least one hint associated with the I/O request, wherein the at least one hint may indicate the importance of the data as determined by the attributes of the file system contextual information, and the relative importance of the data associated with the hint determines whether the data is to reside in a relatively faster storage medium or a relatively slower storage medium; and send the at least one hint to the lower level storage tier.

Further, an embodiment can include a non-transitory computer-readable medium embodying computer code for causing a computing device to perform a method for generating and communicating file system hints, the computer code causing the computing device to execute: receiving an I/O request from a file system layer; checking the I/O request for file system contextual information; accessing the file system layer to determine attributes of the file system contextual information; receiving the attributes of the file system contextual information from the file system layer; analyzing attributes of the file system contextual information; generating at least one hint based upon analyzing the attributes of the file system contextual information, said at least one hint may indicate the importance of the data as determined by the attributes of the file system contextual information, and the relative importance of the data associated with the hint determines whether the data is to reside in a relatively faster storage medium or a relatively slower storage medium; and sending the hint to a lower level storage tier.

It is to be understood that both the foregoing general description and the following detailed description are exemplary and explanatory only and are not restrictive of the invention claimed. The accompanying drawings, which are incorporated in and constitute a part of the specification, illustrate embodiments of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Embodiments of the invention may include hinting. Hinting allows certain host or application specific information to be passed to a lower level, such as a lower level storage tier. Hinting allows information that would not otherwise be available to the lower level to be used for more efficient caching. For example, hinting information may be utilized for improved caching or auto-tiering. Hinting may enable weighted averages (weight-ages) of various metadata information to be passed down to the lower level. Hinting may further include passing a data access pattern of the file system or application down to the lower level. The lower level may then act or respond more efficiently or appropriately based upon characteristics of data obtained through hinting. For example, hints may be provided as an advisor or director for a lower level storage controller (e.g., a MegaRAID® storage controller), driver, system, or associated software or firmware.

Hinting can comprise file system specific hinting and/or application specific hinting. File system hinting can be derived without dependency on other applications. Application specific hinting can include support from one or more respective applications. The hinting solution can also expose APIs which can override the default application hinting algorithm/mechanism, and these APIs will enable applications to provide more specific hints and have better control over the hints. Additionally, a set of generic APIs can be made available such that applications can use the APIs to pass hints to lower levels.

Embodiments of the invention may access the file system architecture to obtain file system contextual information without modifying the file system or file system architecture. Embodiments of the present invention may further be file system agnostic or mostly file system agnostic. Being file system agnostic allows embodiments of the invention to work on and across various types of file systems without being dependent on a particular format or language of a file system. Additionally, because embodiments of the present invention may take the access pattern of a region into account as well as the type of data, embodiments may obtain application contextual information. Therefore, implementations and embodiments may be configured to generate and communicate either or both of file system hints and application driven hints.

Figure 1:
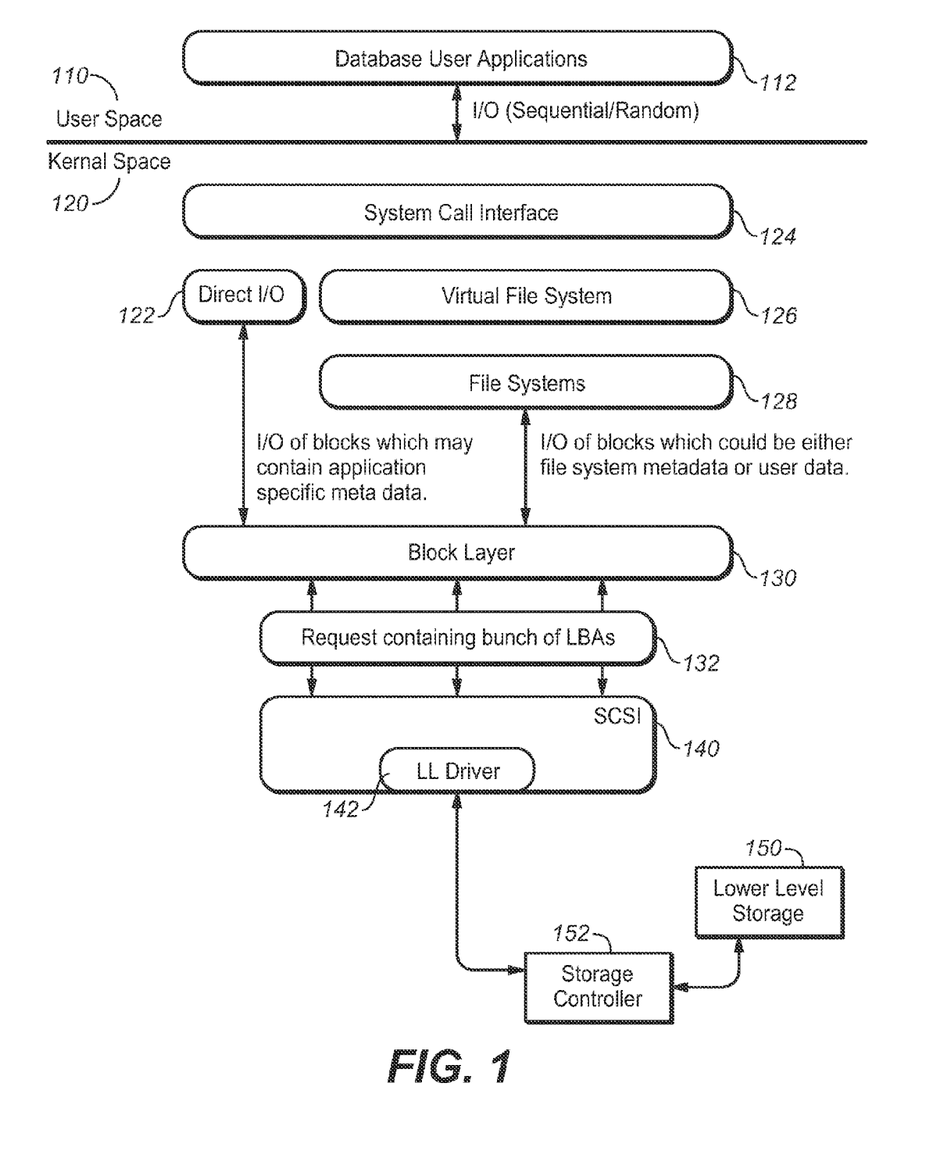
FIG. 1 shows a diagram of layers in user space and kernel space in a currently implemented system topology.

Referring to FIG. 1, a currently implemented system topology 100 is depicted. The system topology 100 may typically include a user space 110 and a kernel space 120. Database/user applications 112 may typically reside in the user space 110. The database/user applications may make I/O requests from the user space 110 to the kernel space 120. The database/user application requests may comprise sequential or non-sequential I/O requests and may include random I/O requests. Different implementations of system topologies may include additional components, hardware, software, or layers residing on the user space 110.

The kernel space 120 may operate below the user space 110. The kernel space may include direct I/O 122, a system call interface 124, one or more virtual file systems 126, one or more file systems 128, a block layer 130, requests 132 containing a plurality of LBAs (logical block addresses), a SCSI layer 140. Different implementations of system topologies may include additional components, hardware, software, or layers residing on the kernel space 110, and for example, may include storage controllers (e.g., 152) and storage systems 150.

The direct I/O 122 may send I/O requests to the block layer 130. The I/O requests may contain application specific data.

The system call interface 124 may be configured to send or receive calls or I/O requests from applications running on the user space 110 for services requested in the kernel space 120.

The virtual file system 126 may comprise an abstraction layer on top of a file system (e.g., 128). The virtual file system 126 may be configured to allow multiple and different types of physical file systems (e.g., 128). For example, the virtual file system 126 can be implemented with a VMware product. The file system 128 can be configured to organize files or data. The file system 128 may include files and data, wherein the files and data may include or comprise metadata. The file system 128 may send I/O requests to a block layer 130, and the I/O requests of the block layer 130 may include at least one of user data, file system metadata, other data, or other metadata.

A file system of a file system layer, as well as a virtual file system of a virtual file system layer, can contain data (e.g., files) and metadata. The metadata can contain information about some data structures. Files may be associated with inodes (index nodes) or vnodes (virtual index nodes). An inode or a vnode may be identified by an integer number. Inodes or vnodes may store information about files and directories (e.g., folders). For example, inodes or vnodes may contain information about file type, file ownership, or access mode (e.g., read, write, permissions, etc.).

The block layer 130 can be configured to receive I/O requests from the file system 128 and the direct I/O 122. Likewise, the file system 128 and the direct I/O may be configured to access the block layer. The block layer 130 may be communicatively connected to a SCSI layer 140. The block layer 130 may be configured to send one or a plurality requests to a storage system 150 and a storage system controller 152 over a SCSI layer 140.

The SCSI layer 140 may include SAS (serial attached SCSI) connectivity or fibre channel connectivity. The SCSI layer 140 may communicatively connect the block layer 130 to a storage system 150. The SCSI layer may further communicatively connect a plurality of devices, layers, or systems, such as host systems, storage systems, storage controllers, controllers, expanders, storage networks, computer networks, other block layers, etc.

The storage system 150 may comprise one or a plurality of storage devices, such as some combination of hard disk drives (HDDs) or solid state drives (SSDs). The storage system 150 may include a storage controller 152. The storage system 150 may be a lower level storage system. Lower level storage systems may include RAID storage systems and RAID tiered storage systems.

The storage system 150 may include an integrated, integratable, connected, or associated storage controller 152. The storage controller 152 may be configured to efficiently handle, transfer, coordinate, and manage storage tasks, such as routing and receiving read/write I/O requests. The storage controller may include software or firmware, comprising code stored in a computer-readable storage medium. The software or firmware of the storage controller may be configured to operate and handle the storage controller tasks.

Figure 2:
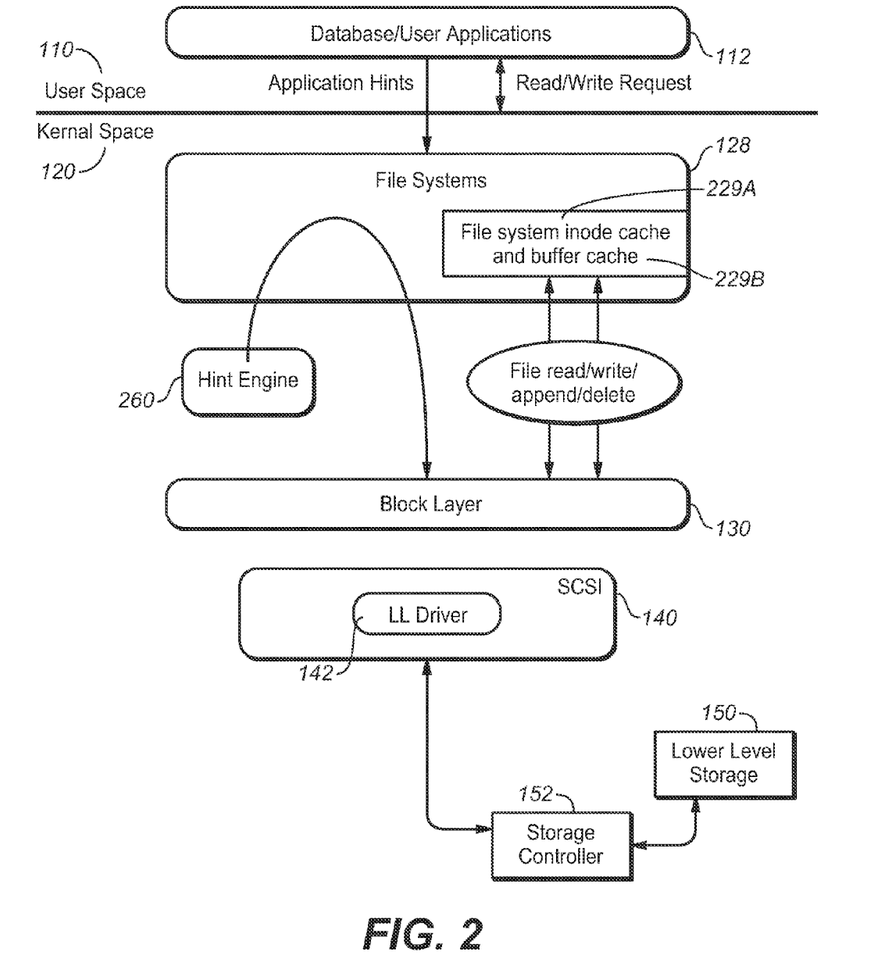
FIG. 2 shows a flow diagram of a system topology configured for hinting.

Referring to FIG. 2, a system topology 200, including a hint engine 260, is depicted. Similar to FIG. 1, the system topology 200 may comprise a user space 110, a kernel space 120, database/user applications 112, a file system 128, a block layer 130, a SCSI layer 140, a storage system driver 142, a storage system 150, and a storage controller 152. The file system 128 may further include a file system inode (index node) cache 229A and a buffer cache 229B. The system topology 200 can also include a hint engine 260.

In preferred implementations, the storage system 150 can comprise a tiered storage system or a tiered RAID (Redundant Array of Independent Disks) storage system, such as a MegaRAID® storage system. The tiered storage system or tiered RAID storage system may include one or more HDDs, one or more SSDs, or one or more other storage devices. The tiered storage system or tiered RAID storage system may further include one or more memories, one or more caches, and one or more processors, as well as software or firmware. In preferred implementations, the storage controller 152 can comprise a MegaRAID® CacheCade storage controller card running a version of MegaRAID® CacheCade software (e.g., MegaRAID® Cachecade Pro v, 2.0). Additionally, a storage system driver or storage controller driver (e.g., 142) may be configured to interface with the storage controller 152 or storage system 150, and the storage system driver 142 may reside on a device or system connected on the SCSI layer. Alternatively, the storage system driver 142 may be located on the storage controller 152. The storage system and storage controller can be configured in a tiered storage system such that hot data is stored in a more quickly accessible storage type such as an SSD and cooler data is stored in a less quickly accessible storage type such as a standard HDD.

Still referring to FIG. 2, the hint engine 260 may be configured to receive, derive, or intercept hints from I/O requests passed from the file system 128 layer to the block layer 130. The I/O requests, which the hint engine may intercept and derive hints from, may include file read, write, append, delete, move, copy, etc. The hint engine 260 may reside in or below the file system 128 layer. Additionally, the hint engine 260 may reside in or above the block layer 130. For example, the hint engine 260 may reside between the file system 128 layer and the block layer 130. The hint engine may be configured to check I/O requests for file system contextual information. For example, file system contextual information may comprise at least one of file system metadata, a file system access pattern, a file system inode (index node), a file system vnode (virtual index node), a file system super block, a transaction log of a journaling file system blocks (such as a group descriptor table, a block bitmap, an inode bitmap, or an inode table) that have special significance and influence or reflect the file system layout, or metafiles (such as an inode metafile) that have special significance and influence or reflect the file system layout.

Database/user applications 112 of the system topology 200 may pass application hints with read/write requests. For example, applications may pass application hints during, before, or after sending read/write requests from the user space 110 to layers (e.g., the file system 128 layer, a virtual file system layer 126, a system call interface 124, or the block layer 130) of the kernel space 120. An application hint may be passed as part of a read/write request or may comprise one or more separate signals, transmissions, notifications, or messages sent before or after the read/write request.

Figure 3:
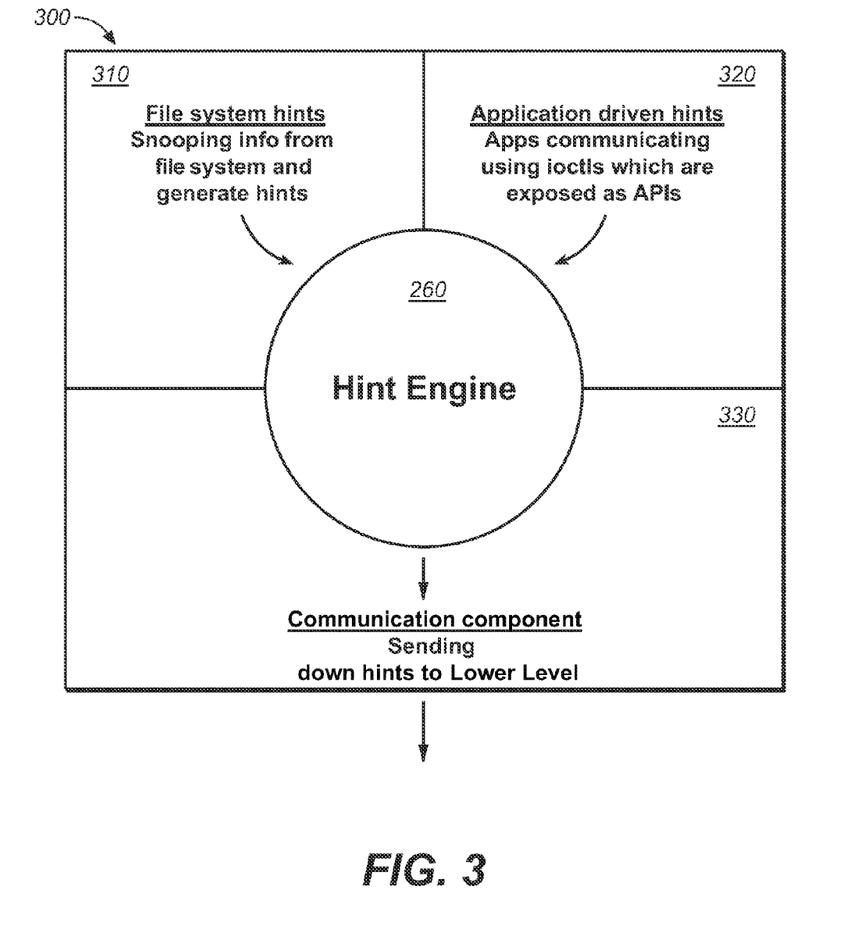
FIG. 3 shows a block diagram of a filter driver including a hint engine.

Referring to FIG. 3, a diagrammatic embodiment of a filter driver 300 is shown. The filter driver 300 may include a hint engine 260 and communication component 330. The hint engine of the filter driver can be configured to derive at least one of file system hints 310 or application driven hints 320.

The filter driver 300 or the hint engine 260 of the filter driver 300 may be configured to generate file system hints 310. The filter driver 300 or the hint engine 260 may be configured to obtain information from a file system 128 by snooping, intercepting, or receiving read/write requests sent from the file system 128. The hint engine 260 may then generate or derive file system hints 310 from the information obtained from the file system 128.

The filter driver 300 or the hint engine 260 of the filter driver 300 may be configured to generate application driven hints 320. The hint engine 260 or the filter driver 300 may generate application driven hints 320 by exposing APIs (application program interlaces) or determining the ioctls (I/O controls) that applications are using to communicate.

The filter driver may include a communication component 330 configured to send or pass at least one of the file system hints 310 or the application driven hints 320 down to a storage system (e.g., 150). The communication component 330 may be configured to send only or primarily send hints (i.e., file system and/or application driven hints) down to the storage system (e.g., 150); alternatively, the communication component 330 of the filter driver 300 may be configured to send hints as part of or contained within normal requests (e.g., read/write I/O requests); still yet, the communication component may be configured to send or pass hints to the storage system and to send or relay standard read/write requests. For example, the communication component 330 of the filter driver 300 may be configured to send or pass the hints before, during, after, or within read/write requests. By further example, in some implementations one or more hints may be attached, inserted, injected, or placed into unused fields of blocks of an I/O request; thereby, the one or more hints may be passed down or sent down to the storage system (e.g., 150) as part of the I/O request.

In some implementations, when an I/O request does not have any unused fields or does not have unused fields with adequate size or capacity, a hint may be passed down in a later message to the storage system 150, or the hint may be passed down in an unused field of a subsequent I/O request. When the hint is passed down as a subsequent message or when placed within an unused field of a subsequent I/O request, the hint may include or be accompanied by an associated offset indicator, the offset indicator indicating at least one of the real I/O request that the hint pertains to, or the amount of time or number of I/O requests which offset the hint from the real I/O request to which the hint pertains. The storage system or storage controller may then reassemble, reunite, or reassociate the separated subsequent hint to the proper I/O request as the storage controller or the storage system receives the I/O request and the associated hint(s) or parts of hints.

Figure 4:
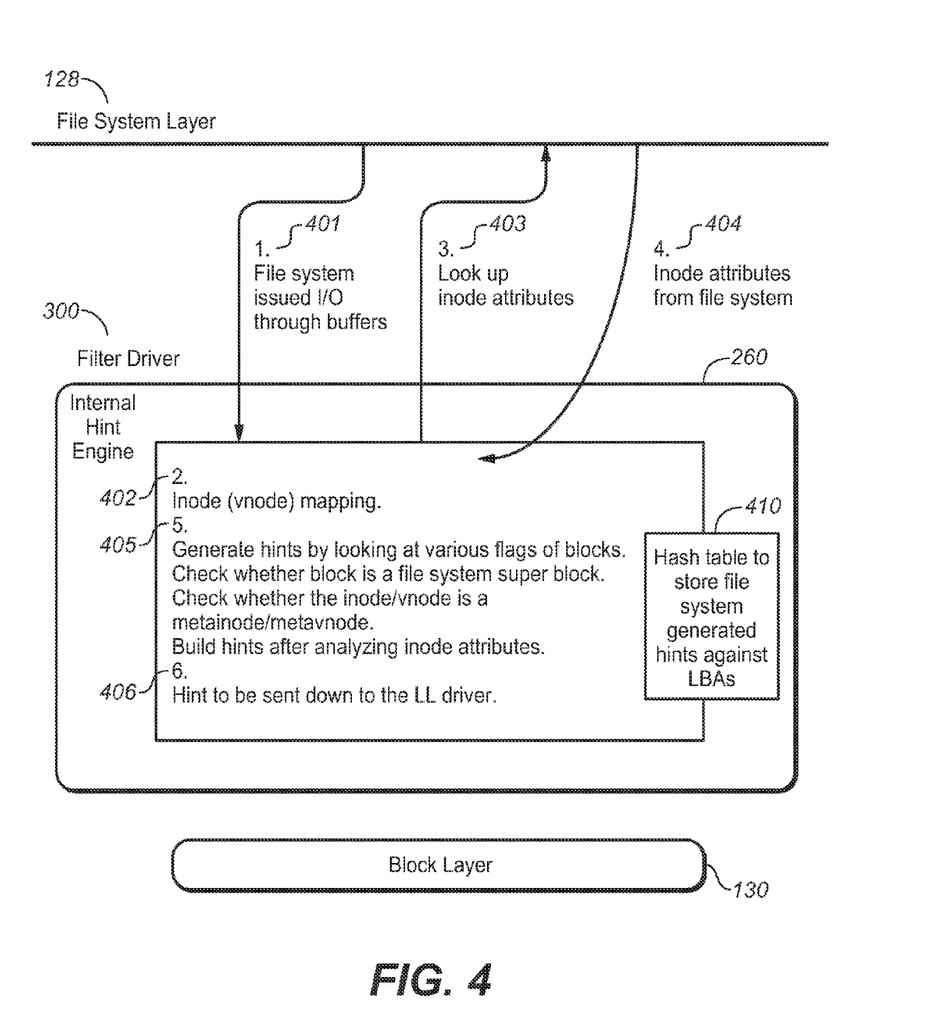
FIG. 4 shows a flow diagram of I/O requests in a file system layer and a filter driver configured for file system hints.

Referring to FIG. 4, a schematic flow diagram for I/O requests and file system hints is shown and may include any or all of steps 401 through 406. It should be noted that the order of steps 401 to 406 as described below is merely exemplary and that in some implementations the order of the steps 401 to 406 may be performed differently or with steps being performed concurrently or simultaneously. As shown in FIG. 4, a filter driver 300 may be located between a file system 128 layer and a block layer 130.

A step 401 may include a file system 128 issuing an I/O request from a buffer or cache (e.g., a file system inode (index node) cache 229A or a buffer cache 229B). The step 401 may further include a filter driver 300 with an included internal hint engine (e.g., 260) intercepting the I/O request issued from the file system.

In a step 402, because the I/O request may refer to inodes (index nodes) and/or vnodes (index nodes of a virtual file system(s)) by block, the internal hint engine (e.g., 260) can perform inode and/or vnode mapping. This inode and/or vnode mapping may provide information relevant to a particular I/O request or to an overarching structure of the file system 128 and/or virtual file system (e.g., 126). Furthermore, because inodes and/or vnodes pertaining to a particular I/O request will not change at least until the I/O request is complete, the information obtained from the mapping will remain accurate at least until the I/O request is complete.

In a step 403, the filter driver 300 or the internal hint engine (e.g., 260) of the filter driver may look up, access, or send a request to look up attributes of the inode and/or vnode in the file system 128 layer.

In a step 404, the file system layer may send the inode and/or vnode attributes of the file system 128 layer to be received by the filter driver 300 or the internal hint engine 260 of the filter driver 300. Some attributes of inodes/vnodes may include inode/vnode numbers, inode/vnode flags, and inode/vnode types.

In a step 405, the internal hint engine (e.g., 260) may generate hints (e.g., file system hints) by analyzing various flags of blocks, such as super blocks, metainodes (meta-index node), and metavnodes (meta-virtual index node). Meta inodes/meta vnodes are the internal inodes/vnodes which one file system maintains in order to better manage its data. For example, the internal hint engine (e.g., 260) may check and/or determine whether a particular block is a super block based upon a flag or the block number of a particular block. Additionally, for example, the internal hint engine (e.g., 260) may check or determine whether a particular block is metainode and/or a metavnode based upon a flag of a particular block. The internal hint engine (e.g., 260), may then build or generate hints after analyzing inode and/or vnode attributes.

In a step 406, the filter driver, the internal hint engine of the filter driver, or the communication component of the filter driver may send or pass down the generated hint to a storage system driver (e.g., 142), a storage controller (e.g., 152), or a storage system (e.g., 150) via a SCSI layer (e.g., 140).

In further reference to FIG. 4, the filter driver 300 or the internal hint engine 260 of the filter driver 300 may include a hash table 410. The filter driver 300 or the internal hint engine 260 of the filter driver 300 may maintain a hash table 410 to store generated hints (e.g., file system hints) against LBAs (logical block addresses). Generated hints may be stored in the hash table 410 as they are generated. Entries of the hash table 410 may be updated as the internal hint engine generates additional hints relevant to existing entries in the hash table or obtains additional information.

Some file system metadata hints may include information related to super blocks and metafiles.

Super blocks typically get flushed very frequently in order to maintain consistency. Therefore, a file system metadata hint related to a super block may be regarded as very hot. Super blocks are typically well defined across most file systems. Typically, a super block may be detected from the block number itself.

Regarding metafiles, all or most metafiles have or are associated with reserved inode numbers for a particular file system. Metafiles are typically not large, but in large file systems, metafiles can become large. Under the circumstances where a file system includes large metafiles, a filter driver or hint engine may select to only generate hints related to particular metafiles, such as inode map metafiles or block map metafiles. A file system metadata hint related to metafiles may include, for example, inode map metafiles or block map metafiles. A file system metadata hint related to metafiles (e.g., inode map metafiles or block map metafiles) may be regarded as very hot.

Some file system I/O related hints may include information related to replacement writes, recovery writes, block pre-allocations, and reads.

Replacement write I/O requests may happen during a file-system-wide data flush to the storage or a write hardening which indicates the possibility of data being written in order to free resources. Therefore, a file system I/O related hint may be regarded as hot because the I/O (e.g., write) request should be completed quickly. Flags passed to the block layer may indicate replacement write.

Recovery write I/O requests typically may be triggered by a user in order to ensure data persistency before a crash happens, and in this case of a crash, a hint may not be provided.

Applications pre-allocate blocks for later use. Block pre-allocation requests may be considered as cold because pre-allocation requests happen in append mode and normally involve a large number of blocks to be allocated.

Regarding READ I/O requests, typically every file system has its own buffer cache which follows a particular recency based algorithm, and therefore, a hint may include information indicating that data related to READ I/O requests may not be accessed soon. Therefore, READ I/O requests may be considered as cold.

Figure 5:
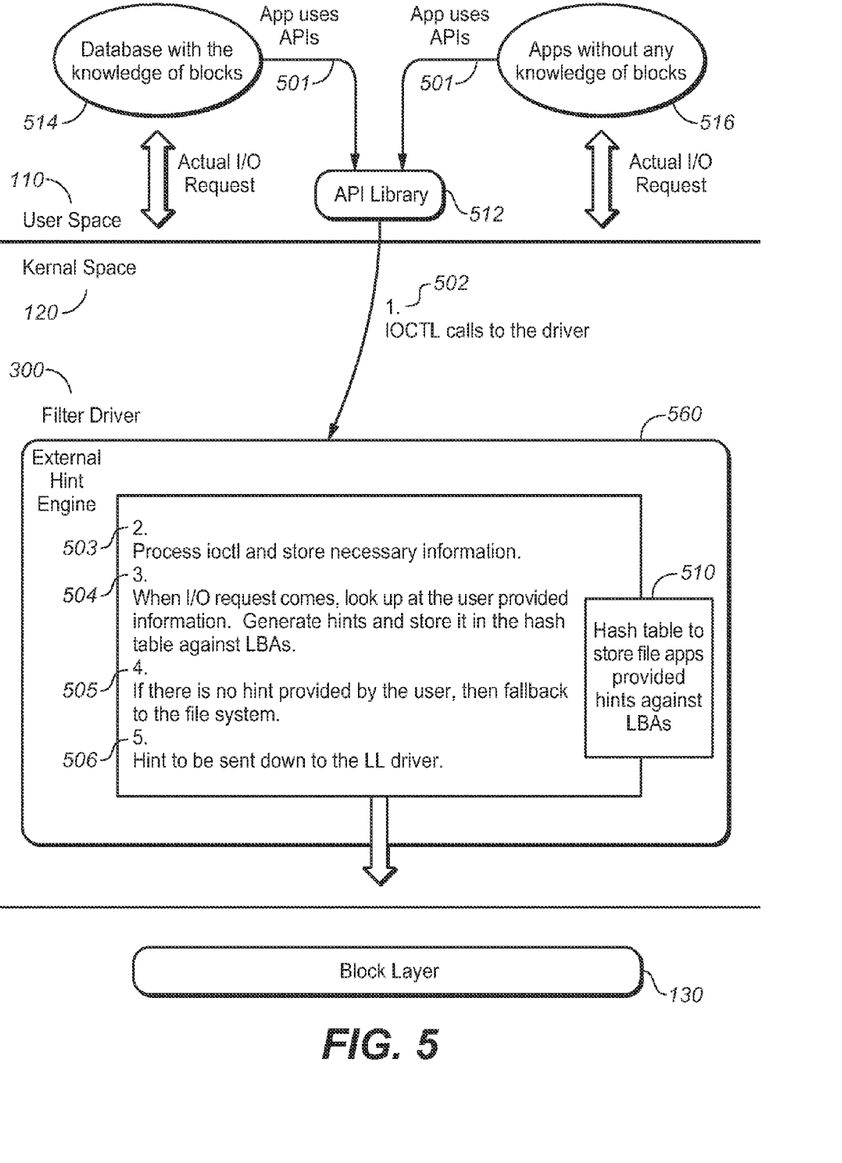
FIG. 5 shows a flow diagram of I/O requests in a file system layer and a filter driver configured for application hints.

Referring to FIG. 5, a schematic flow diagram for I/O requests and application hints is shown and may include any or all of steps 501 through 506. As shown in FIG. 5, a filter driver (e.g., 300) may be located between a file system 128 layer and a block layer 130 in the kernel space 120. The filter driver may include, contain, or be associated with an external hint engine (e.g., 560 or 260). A database/user application layer (e.g., 112) of the user space 110 may include one or more databases (e.g., 514), one or more applications, (e.g., 516), and one or more API (application programming interface) libraries (e.g., 512).

A step 501 may include applications or database applications using (e.g., accessing or interfacing) the API library 512 to send I/O requests. Additionally, some databases may be configured with a preexisting knowledge of block structure such that the databases with the preexisting knowledge of the block structure may be configured to perform direct I/O with the block layer (e.g., 130). Other databases may not have a preexisting knowledge of the block structure. Applications, on the other hand, typically may not have a preexisting knowledge of the block structure.

In a step 502, one or more ioctl (I/O controls) calls may be sent to a driver (e.g., the filter driver (e.g., 300) or the storage system driver (e.g., 142)). The ioctls (i.e., ioctl calls) may be system calls for device-specific I/O operations. For example, an ioctl or ioctl interlace may comprise a single system call through which the user space (e.g., 110) may communicate with device drivers (e.g., storage system driver 142 or filter driver 300). Additionally, requests sent via ioctls to a device driver may be vectored with respect to an ioctl system call, and the ioctl system call may include a handle to the device and a request number.

In a step 503, the filter driver (e.g., 300) or an external hint engine (e.g., 560 or 260) of the filter driver may process the ioctls. The external hint engine (e.g., 560 or 260) may also store the ioctls themselves or may store information obtained from processing the ioctls. The ioctl related information may be stored for later use. For example, the ioctl related information may be stored in a hash table (e.g., 510 or 410) for later reference.

In a step 504, the filter driver (e.g., 300) or the external hint engine (e.g., 560 or 260) of the filter driver (e.g., 300) may receive an I/O request. In response to receiving the I/O request or when the I/O request is received, the external hint engine (e.g., 560 or 260) may look up or access user provided information. The external hint engine (e.g., 560 or 260) may then analyze the user provided information to generate a hint (e.g., an application driven hint) or hints. The external hint engine (e.g., 560 or 260) may store the generated hint or hints in a hash table (e.g., 510 or 410).

In a step 505, the external hint engine (e.g., 560 or 260) may determine whether to fallback to a file system hint mechanism. If the external hint engine (e.g., 560 or 260) determines that insufficient user provided information (e.g., no user provided information or very little user provided information) is received such that a hint cannot be generated, the external hint engine (e.g., 560 or 260) may determine that the hint engine should fallback to the file system hint mechanism (e.g., an internal hint engine of a filter driver configured to generate file system hints) pertaining to a particular I/O request or ioctl. Likewise, the external hint engine (e.g., 560 or 260) may determine not to fallback to a file system hint mechanism if a hint can be generated from the user provided information or if there is no relevant or associated file system hint. Additionally, the external hint engine may determine or judge the usefulness of the hint generated from the user provided information to be relatively low and may decide to supplement or augment the hint generated from the user provided information with a file system hint generated by the file system hint mechanism. In some implementations, when possible (e.g., when a file system hint and an associated application driven hint exist), the external hint engine may always or nearly always choose to supplement or augment the hint generated from the user provided information with a file system hint generated by the file system hint mechanism. In other implementations, the external hint engine may only decide to augment or supplement if a particular file system hint contributes or adds to the value or usefulness of a particular application driven hint.

In a step 506, a hint may be sent or passed down to a storage system driver. The filter driver, the external hint engine of the filter driver, or the communication component of the filter driver may send or pass down the generated hint to a storage system driver (e.g., 142), a storage controller (e.g., 152), or a storage system (e.g., 150) via a SCSI layer (e.g., 140).

In further reference to FIG. 5, the filter driver (e.g., 300) or the external hint engine (e.g., 560 or 260) of the filter driver (e.g., 300) may include a hash table (e.g. 510 or 410). The filter driver (e.g., 300) or the external hint engine (e.g, 560 or 260) of the filter driver (e.g., 300) may maintain a hash table (e.g., 510 or 410) to store generated hints (e.g., file system hints) against LBAs (logical block addresses). Generated hints may be stored in the hash table (e.g., 510 or 410) as they are generated. Entries of the hash table (e.g., 510 or 410) may be updated as the external hint engine generates additional hints relevant to existing entries in the hash table or obtains additional information.

Some application specific hints may include information related to defining a particular file to be hot or cold, defining hot data of the application through blocks, or setting or unsetting a context before an actual I/O.

Regarding defining a particular file to be hot or cold, an API may take the filename or filename with a specific extension whose data would be hot/cold. Defining application specific metadata can be very useful. A pathname can be translated into an inode number for hinting.

Regarding defining hot data of the application through blocks, an API can take a range of blocks which can be described as hot/cold data. Defining hot data of the application through blocks may be useful where it is important for an application to have knowledge of the blocks. Hinting can include a set of block numbers.

Regarding setting or unsetting a context before an actual I/O, setting/upsetting a context may mention a forthcoming I/O to be hot/cold. This may be useful for an application comprising a standalone application for storage or where a user may define the importance of the data prior to the I/O. Hinting may include at least one process identifier number.

Furthermore, file system hints (e.g., the file system hints described above) may be utilized in conjunction with or to improve the effectiveness of application driven hinting. Application hinting can include application improvised hinting. Application improvised hinting can include exposing one or more APIs and overriding a default hinting mechanism to incorporate information derived from file system hints. Application improvised hinting can be implemented through receiving file system hints, accessing file system hints, or accessing a hash table containing file system hints. Application improvised hinting may include accessing a hash table, which contains file system hints, and generating one or more application hints based upon the file system hints.

Figure 6:
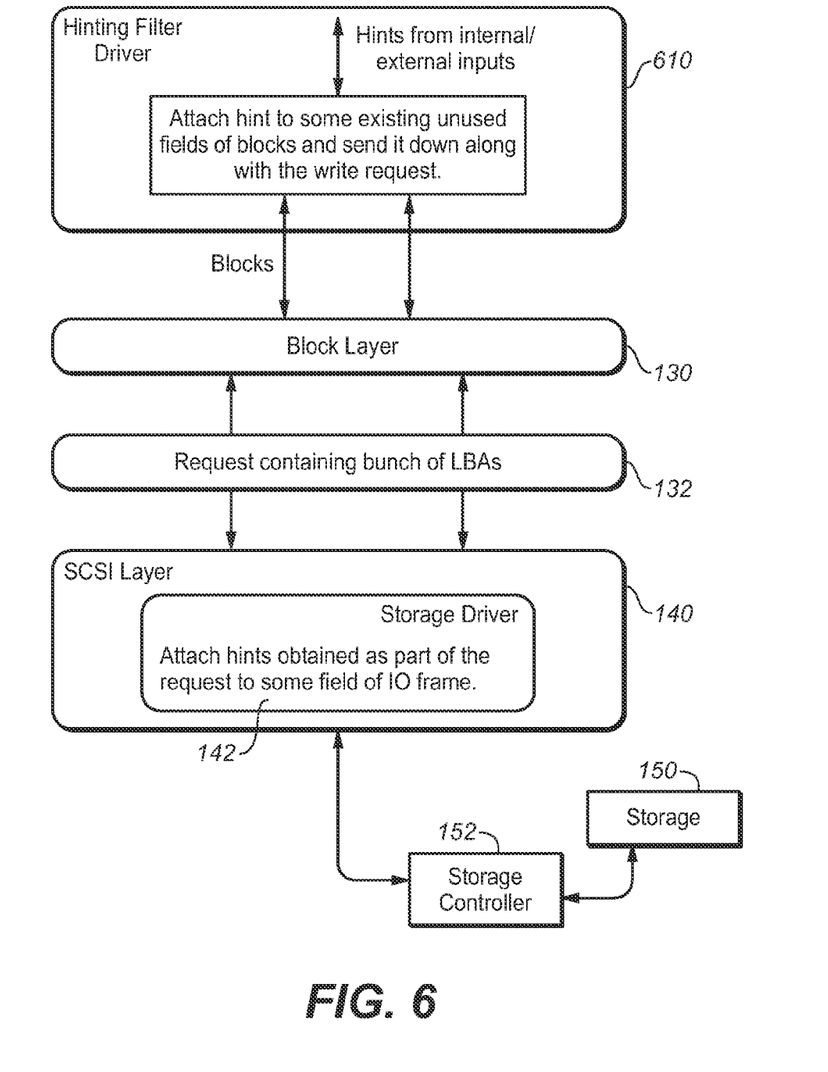
FIG. 6 shows a flow diagram of a first approach for hint communication.
Figure 7:
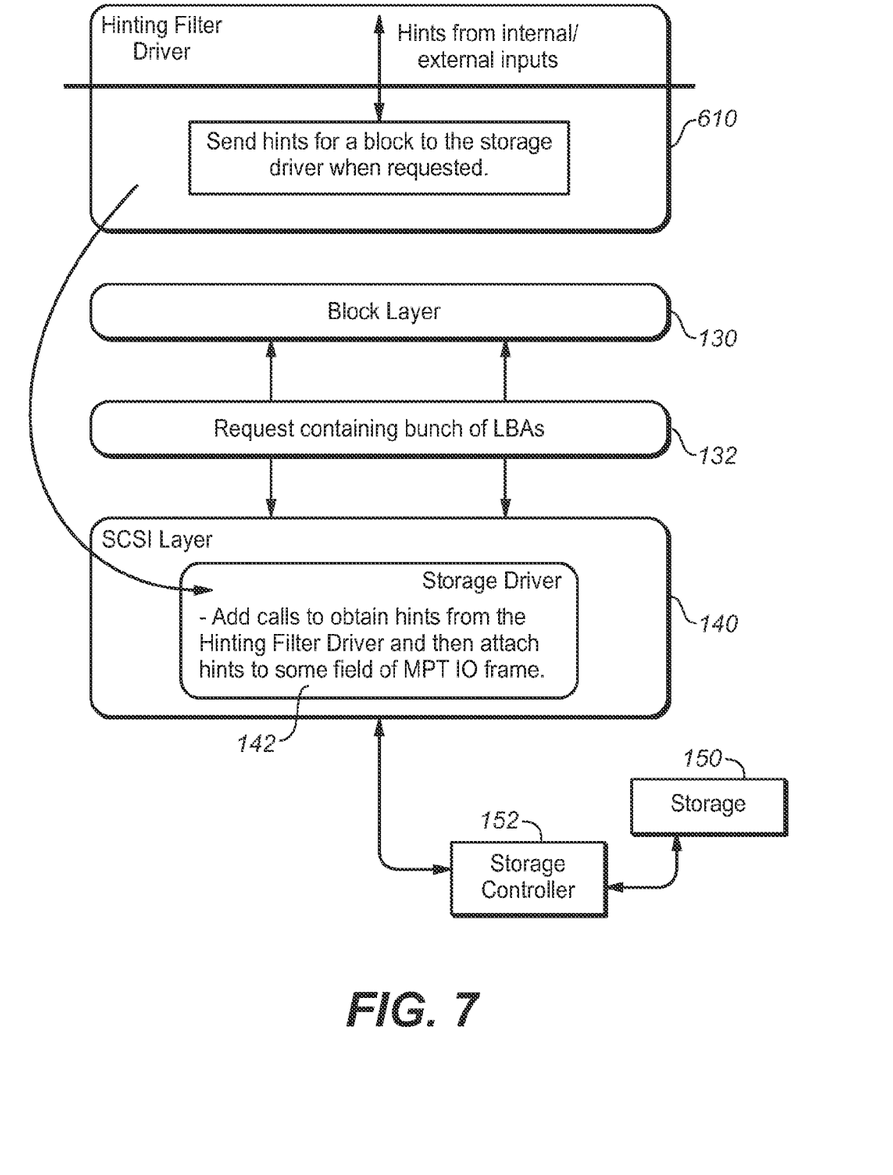
FIG. 7 shows a flow diagram of a second approach for hint communication.

Referring to FIGS. 6 and 7, schematic flow diagrams showing different methods of communicating a hint from a hinting filter driver 610 to a storage system 150 are shown. FIGS. 6 and 7 depict a hinting filter driver 610, a block layer 130, requests 132 containing one or a plurality of LBAs from the block layer 130 to the SCSI layer 140. The hinting filter driver 610 may include the functionality of or comprise the previously mentioned filter driver (e.g., 300). The hinting filter driver 610 may be located above the block layer 130. The hinting filter driver may include the functionality of, contain, comprise, or be associated with one or more hint engines, such as an internal hint engine and/or an external hint engine (e.g., 560 or 260).

In FIGS. 6 and 7, a hinting filter driver 610 may receive information used in generating hints from internal or external inputs. For example, internal inputs may include I/O requests received from a file system and may be used in generating file system hints with an internal hint engine. Also, for example, external inputs may include ioctls received from applications or databases of a user space and may be used in generating application driven hints with an external hint engine.

Referring now to FIG. 6, a first approach of communicating a hint from a hinting filter driver 610 to a storage system 150 is shown. In the first approach, a hinting filter driver 610 may attach one or more hints to one or more existing unused fields of one or more blocks, and then send the hint and the blocks down together as part of an I/O request (e.g., a write request) down to a storage system driver 142, storage controller 152, or a storage system 150 via the SCSI layer 140. For example, a file system hint may be passed from the hinting filter driver 610 to a storage system driver (e.g., 142) by attaching the file system hint in an unused field of a block sent down to a storage driver. A storage driver may then receive the hint attached in an unused field of a block as part of an I/O request. The storage driver 142 may then attach the hint to a field of an I/O frame and pass the I/O frame with the attached hint down to the storage controller 152 and/or the storage system 150. In some implementations of the invention, the storage driver 142 may comprise a storage driver configured to communicate using message passing technology (MPT). The advantage of the first approach is that the hint stays with the data.

Some implementations of communicating a particular hint from the hinting filter driver may include a modified, hybrid, or alternative first approach. For example, some implementations of communicating a particular hint may include attaching the hint as part of an unused field of a block of a later request, if the block of a request which the hint is associated with does not have any unused fields or does not have fields of adequate size. When an I/O request does not have any unused fields or does not have unused fields with adequate size or capacity, a hint may be passed down in a later request to the storage level, or the hint may be passed down in an unused field of a subsequent I/O request. When the hint is passed down as a subsequent message or when placed within an unused field of a subsequent I/O request, the hint may include or be accompanied by an associated offset indicator, the offset indicator indicating at least one of the real I/O request that the hint pertains to, or the amount of time or number of I/O requests which offset the hint from the real I/O request to which the hint pertains. The storage system or storage controller may then reassemble, reunite, or reassociate the separated subsequent hint to the proper I/O request as the storage controller or the storage system receives the I/O request and the associated hint(s) or parts of hints.

Referring now to FIG. 7, a second approach of communicating a hint from a hinting filter driver 610 to a storage system 150 is shown. In the second approach, the hinting filter driver may separately send the I/O request and the hint down to the storage system driver 142, storage controller 152, or a storage system 150. In some implementations, the hinting filter driver may send the I/O request down to the storage level; the hinting filter driver may then wait to receive a request from the storage level for the hint associated with the I/O request; and upon receiving the hint request from the storage level, the hinting filter driver may send the hint down to the storage level. That is, the hinting filter driver 610 may send a hint down to a storage system driver 142, storage controller 152, or a storage system 150 via the SCSI layer 140 when requested by the storage system driver 142, storage controller 152, or a storage system 150. Accordingly, the storage driver 142 may be configured to receive the I/O request and may be configured to send calls to request hints from the hinting filter driver 610. Upon receiving the hint and the associated I/O request, the storage driver 142 may attach the hint to a field of an I/O frame and pass the I/O frame with the attached hint down to the storage controller 152 and/or the storage system 150. In some implementations of the invention, the storage driver 142 may comprise a storage driver configured to communicate using a version of MPT protocol. The second approach does not require dependency upon blocks of I/O requests having unused or spare fields.

Figure 8:
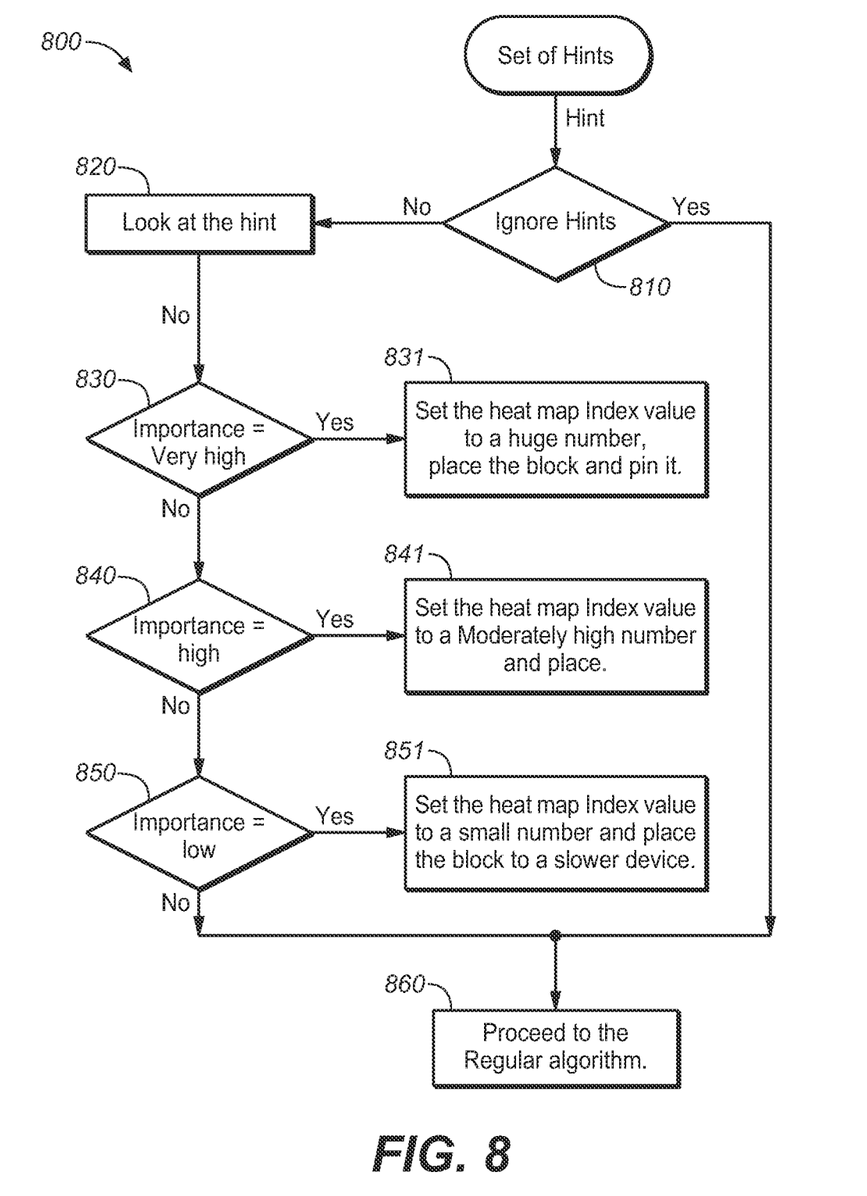
FIG. 8 shows a flow diagram for hint processing.

Referring now to FIG. 8, a flow chart associated with hint processing is shown. Hint processing may be carried out by hardware, firmware, or software at the storage level by a hint processing component or module, such as by or at the storage driver 142, the storage controller 152, the storage system 150, or the like. In a preferred embodiment, the hint processing may be performed by firmware on the storage controller 152. As the hint processing receives hints, the hint processing component may perform a method 800 for processing hints. The method 800 may include any or all of steps 810, 820, 830, 831, 840, 841, 850, 851, and 860.

A step 810 may include checking and/or determining whether the hint processing component or module should process or ignore hints. If the hint processing component or module determines that hints should be processed rather than ignored, the hint processing component or module may then proceed to step 820. If the hint processing component or module determines that hints should be ignored, the method 800 may then include proceeding to a step 860 to proceed with a regular I/O request storage algorithm.

The step 820 may include looking at and/or analyzing a particular hint to determine the importance or "hotness" of the particular hint such that the hint processing component or module can set a heat map index value for the particular hint through at least one of steps 830, 831, 840, 841, 850, 851 or additional importance or "hotness" determinations not shown in FIG. 8.

In the step 830, if the hint processing component or module determines the particular hint to be of very high importance or "very hot", the hint processing component or module may in step 831 set a particular heat index value to a very large number, place the block or blocks associated with the particular hint, and pin the block or blocks associated with the particular hint.

In the step 840, if the hint processing component or module determines the particular hint to be of high importance or "hot", the hint processing component or module may in step 841 set a particular heat index value to a moderately large number and place the block or blocks associated with the particular hint.

In the step 850, if the hint processing component or module determines the particular hint to be of low importance or "cold", the hint processing component or module may in step 851 set a particular heat index value to a very low number and place the block or blocks associated with the particular hint in a slower storage location (e.g., in a slower storage device).

It should be noted that steps 830, 831, 840, 841, 850, and 851 are merely exemplary and that a particular heat index value may be set to be a value of any range of integer or non-integer values.

After completion of at least one of steps 830, 831, 840, 841, 850, 851, or 860, the method may include a step 860 to proceed with the regular I/O request storage algorithm.

Figure 9:
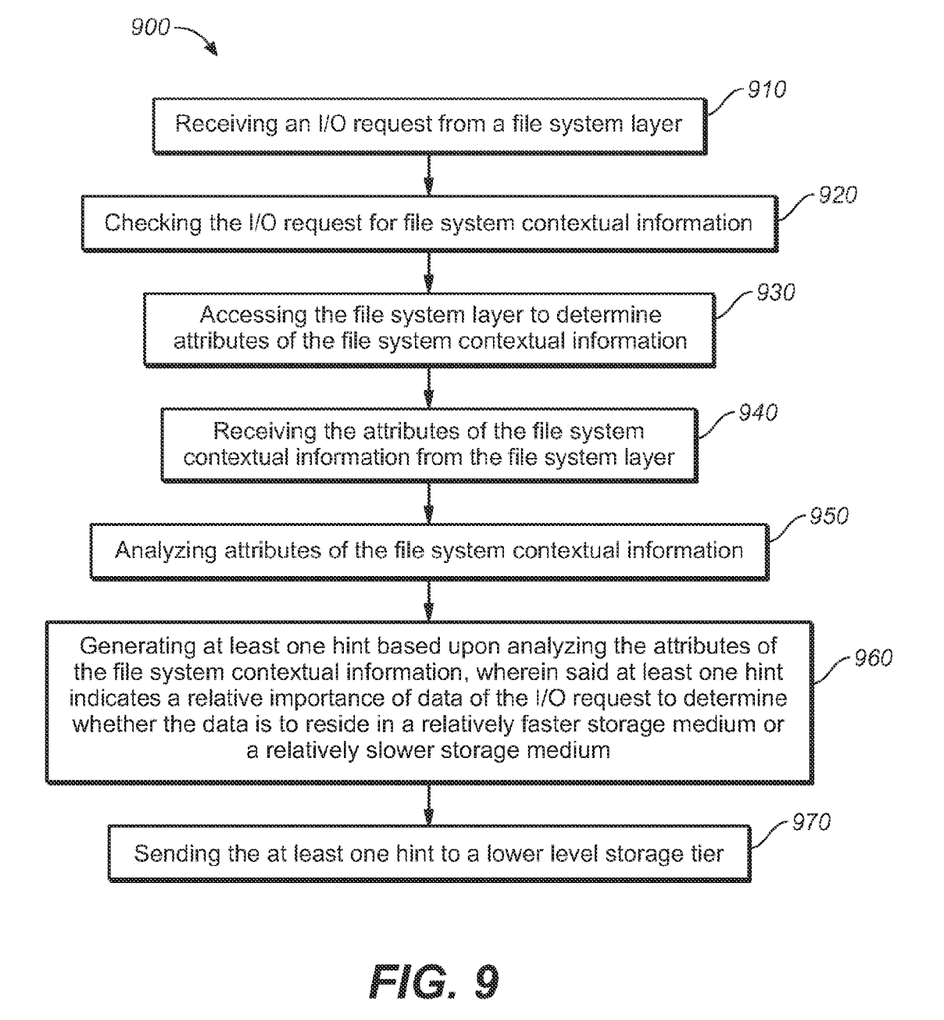
FIG. 9 shows a method for generating and communicating file system hints.

Referring to FIG. 9, an embodied method 900 associated with generating and communicating hints is depicted. It is contemplated that embodiments of the method 900 may be performed by a filter driver, software or firmware executed on a computing device (such as a processor of the filter driver), a hint engine, other computing devices, other computer components, or on other software, firmware, or middleware. The method 900 may include any or all of steps 910, 920, 930, 940, 950, 960, or 970, and it is contemplated that the method 900 may include additional steps as disclosed throughout, but not explicitly set forth in this paragraph. Further, it is fully contemplated that the steps of method 900 may be performed concurrently or in a non-sequential order. The method 900 may include a step 910, wherein the step 910 may include receiving an I/O request from a file system layer. The method 900 may include a step 920, wherein the step 920 may include checking the I/O request for file system contextual information. Checking the I/O request for file system contextual information may include checking at least one of a flag, a state (such as a state of an inode), or a field (such as a field of an inode) of at least one block of the I/O request for file system contextual information. The method 900 may include a step 930, wherein the step 930 may include accessing the file system layer to determine attributes of the file system contextual information. The method 900 may include a step 940, wherein the step 940 may include receiving the attributes of the file system contextual information from the file system layer. The method 900 may include a step 950, wherein the step 950 may include analyzing attributes of the file system contextual information. The method 900 may include a step 960, wherein the step 960 may include generating at least one hint based upon analyzing the attributes of the file system contextual information, wherein said at least one hint indicates a relative importance of data of the I/O request to determine whether the data is to reside in a relatively faster storage medium or a relatively slower storage medium. The method 900 may include a step 970, wherein the step 970 may include sending the at least one hint to a lower level storage tier. The method may also include use of a mechanism to provide weight-age of data passed from the application.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for generating and communicating file system hints, the method comprising:
   receiving an I/O request from a file system layer;
   checking the I/O request for file system contextual information;
   accessing the file system layer to determine attributes of the file system contextual information;
   receiving the attributes of the file system contextual information from the file system layer;
   analyzing the attributes of the file system contextual information;
   generating at least one hint based upon analyzing the attributes of the file system contextual information, wherein said at least one hint indicates a relative importance of I/O request data associated with the hint and is configured to be used to direct relatively more important I/O request data to be stored in a relatively faster storage medium; and
   sending the at least one hint to a lower level storage tier.

2. The method of claim 1, wherein the file system contextual information comprises at least one of file system metadata, a file system access pattern, a file system inode (index node), a file system vnode (virtual index node), a file system super block, a transaction log of a journaling file system, a group descriptor table, a block bitmap, an inode bitmap, an inode table, or an inode metafile.

3. The method of claim 1, wherein the file system contextual information comprises at least a file system super block.

4. The method of claim 1, wherein the file system contextual information comprises at least file system metadata.

5. The method of claim 1, wherein the file system contextual information comprises at least one of a file system inode (index node) or a file system vnode (virtual index node).

6. The method of claim 5, wherein checking the I/O request for file system contextual information further comprises:
   checking at least one of a flag, a state, or a field of at least one block of the I/O request for file system contextual information.

7. The method of claim 5, wherein checking the I/O request for file system contextual information further comprises:
   checking whether at least one block of the I/O request includes a super block.

8. The method of claim 5, wherein checking the I/O request for file system contextual information further comprises:
   checking whether the file system inode or the file system vnode is a metainode (meta-index node) or a (meta-virtual index node) metavnode.

9. The method of claim 1, wherein receiving an I/O request from the file system layer further comprises:
   receiving an I/O request from a file system inode (index node) cache or from a buffer cache of the file system layer, wherein receiving occurs between the file system layer and a block layer.

10. The method of claim 1, further comprising:
    storing the at least one hint against at least one logical block address associated with the I/O request in a hash table.

11. The method of claim 1, wherein the lower level storage tier comprises at least one of a lower level storage driver, a lower level storage controller, or a lower level storage system.

12. The method of claim 1, wherein sending the at least one hint to the lower level storage tier further comprises:
    attaching the at least one hint to at least one unused field of at least one block of the I/O request; and
    sending the I/O request to the lower level storage tier.

13. The method of claim 1, further comprising:
    sending the I/O request to a lower level storage tier;
    receiving a request for the at least one hint from the lower level storage tier; and
    wherein sending the at least one hint to a lower level storage tier further comprises:
    sending the at least one hint to a lower level storage tier upon receiving the request for the at least one hint from the lower level storage tier.

14. A device configured to attach to a system topology for generating and communicating file system hints, the device comprising:
    a filter driver, the filter driver configured to communicate with a file system layer, a block layer, and lower level storage tier of the system topology, said filter driver comprising a hint engine and a communication component, said filter driver further configured at least to:
    receive an I/O request from the file system layer;
    check the I/O request for file system contextual information;
    access the file system layer to determine attributes of the file system contextual information;
    receive the attributes of the file system contextual information from the file system layer;
    analyze the attributes of the file system contextual information;
    generate at least one hint based upon analyzing the attributes of the file system contextual information, wherein said at least one hint indicates a relative importance of I/O request data associated with the hint and is configured to be used to direct relatively more important I/O request data to be stored in a relatively faster storage medium; and
    send the at least one hint to the lower level storage tier.

15. The device of claim 14, wherein the file system contextual information comprises at least one of a file system inode (index node) or a file system vnode (virtual index node), and wherein the filter driver is further configured to:
    check at least one of a flag, a state, or a field of at least one block of the I/O request for file system contextual information;
    check whether the at least one block of the I/O request includes a super block; and
    check whether the file system inode or the file system vnode is a metainode (meta-index node) or a (meta-virtual index node) metavnode.

16. The device of claim 14, wherein the filter driver is further configured to:
- attach the at least one hint to at least one unused field of at least one block of the I/O request; and
- send the I/O request to the lower level storage tier with the at least one hint attached.

17. The device of claim 14, wherein the lower level storage tier comprises at least one of a lower level storage driver, a lower level storage controller, or a lower level storage system.

18. A non-transitory computer-readable medium embodying computer code for causing a computing device to perform a method for generating and communicating file system hints, the computer code causing the computing device to execute:
- receiving an I/O request from a file system layer;
- checking the I/O request for file system contextual information;
- accessing the file system layer to determine attributes of the file system contextual information;
- receiving the attributes of the file system contextual information from the file system layer;
- analyzing the attributes of the file system contextual information;
- generating at least one hint based upon analyzing the attributes of the file system contextual information, wherein said at least one hint indicates a relative importance of I/O request data associated with the hint and is configured to be used to direct relatively more important I/O request data to be stored in a relatively faster storage medium; and
- sending the hint to a lower level storage tier.

19. The non-transitory computer-readable medium embodying computer code of claim 18, wherein the file system contextual information comprises at least one of a file system inode (index node) or a file system vnode (virtual index node), and wherein checking the I/O request for file system contextual information further comprises:
- checking at least one of a flag, a state, or a field of at least one block of the I/O request for file system contextual information;
- checking whether the at least one block of the I/O request includes a super block; and
- checking whether the file system inode or the file system vnode is a metainode (meta-index node) or a (meta-virtual index node) metavnode.

20. The non-transitory computer-readable medium embodying computer code of claim 18, wherein sending the at least one hint to the lower level storage tier further comprises:
- attaching the at least one hint to at least one unused field of at least one block of the I/O request; and
- sending the I/O request to the lower level storage tier.

* * * * *